(12) United States Patent
Chun et al.

(10) Patent No.: US 7,269,181 B2
(45) Date of Patent: Sep. 11, 2007

(54) ROBUST RADIO BASE STATION CONTROLLER ARCHITECTURE

(75) Inventors: Dexter Chun, San Diego, CA (US);
Kou-Chun Lee, San Diego, CA (US);
Robert Knight, San Diego, CA (US);
Ravi Palakodety, San Diego, CA (US)

(73) Assignee: Telefonaktiebolaget LM Ericsson (publ) (SE)

( * ) Notice: Subject to any disclaimer, the term of this patent is extended or adjusted under 35 U.S.C. 154(b) by 1223 days.

(21) Appl. No.: 09/826,224

(22) Filed: Apr. 4, 2001

(65) Prior Publication Data

US 2002/0147030 A1   Oct. 10, 2002

(51) Int. Cl.
*H04M 1/00* (2006.01)
*H04B 7/00* (2006.01)

(52) U.S. Cl. ............... 370/422; 370/218; 370/395.1; 455/569

(58) Field of Classification Search ........ 370/217–221, 370/237, 320, 422, 395.1, 396, 398; 455/560
See application file for complete search history.

(56) References Cited

U.S. PATENT DOCUMENTS

| | | | | |
|---|---|---|---|---|
| 5,495,484 A * | 2/1996 | Self et al. | ................... | 370/338 |
| 5,878,036 A * | 3/1999 | Spartz et al. | ................ | 370/335 |
| 5,987,008 A * | 11/1999 | Simpson et al. | ............ | 370/236 |
| 6,018,521 A * | 1/2000 | Timbs et al. | ................. | 370/342 |
| 6,049,543 A * | 4/2000 | Sauer et al. | ................. | 370/335 |
| H1859 H * | 9/2000 | Asthana et al. | ............. | 370/217 |
| 6,115,603 A * | 9/2000 | Baird et al. | .................. | 455/401 |
| H1964 H * | 6/2001 | Hoffpauir et al. | ........... | 370/419 |
| 6,292,485 B1 * | 9/2001 | Trotta et al. | ................. | 370/389 |
| 6,459,699 B1 * | 10/2002 | Kimura et al. | .............. | 370/396 |
| 6,496,475 B1 * | 12/2002 | Ji et al. | ....................... | 370/216 |
| 6,501,768 B2 * | 12/2002 | Marin et al. | ................. | 370/465 |
| 6,574,221 B1 * | 6/2003 | Petersen | ................... | 370/395.1 |
| 6,606,310 B1 * | 8/2003 | Vialen et al. | ................ | 370/338 |
| 6,711,357 B1 * | 3/2004 | Brewer et al. | ................ | 398/54 |
| 6,859,447 B1 * | 2/2005 | Ruutu et al. | ................. | 370/338 |
| 6,967,971 B1 * | 11/2005 | Elliott et al. | ................ | 370/466 |
| 6,975,604 B1 * | 12/2005 | Ishida et al. | ................ | 370/331 |
| 7,039,046 B1 * | 5/2006 | Simons et al. | .............. | 370/388 |

(Continued)

FOREIGN PATENT DOCUMENTS

WO    WO9933207 A    7/1999

(Continued)

*Primary Examiner*—Chi Pham
*Assistant Examiner*—Ahmed Elallam
(74) *Attorney, Agent, or Firm*—Coats & Bennett, P.L.L.C.

(57) ABSTRACT

A base station controller system comprises a high data rate distributed switching fabric providing flexible access to call processing resource pools. The arrangement permits a system controller to selectively assign specific resources depending on call type based on configuring the distributed switching fabric. The transport links comprising the distributed switching fabric provide redundant access to each of the resource pools, greatly reducing the portion of overall call processing capability lost with a single failure. Preferably, the distributed switching fabric comprises a central ATM switch and a number of distributed ATM switches interconnecting the resource pools to the central switching resource. The system may adopt a rack arrangement wherein a processing subrack includes the mix of different processing resources necessary to support substantially all call flow processing for one or more types of calls. The system's call capacity is thus easily scalable based on adding additional processing subracks.

12 Claims, 7 Drawing Sheets

U.S. PATENT DOCUMENTS

| | | |
|---|---|---|
| 7,054,338 B2 * | 5/2006 | Sutton et al. ............... 370/542 |
| 7,092,727 B1 * | 8/2006 | Li et al. ..................... 455/466 |
| 7,133,399 B1 * | 11/2006 | Brewer et al. ............. 370/360 |
| 7,173,922 B2 * | 2/2007 | Beach ........................ 307/338 |
| 2001/0006516 A1 * | 7/2001 | Lee et al. .................. 370/335 |
| 2004/0213188 A1 * | 10/2004 | Struhsaker et al. ......... 370/336 |
| 2004/0213218 A1 * | 10/2004 | Dougherty et al. ......... 370/386 |
| 2006/0194583 A1 * | 8/2006 | Tamura et al. .............. 455/442 |

FOREIGN PATENT DOCUMENTS

| | | |
|---|---|---|
| WO | WO9933319 A | 7/1999 |
| WO | WO9949624 A | 9/1999 |
| WO | WO0152571 A | 7/2001 |

* cited by examiner

ROBUST RADIO BASE STATION CONTROLLER ARCHITECTURE

BACKGROUND OF THE INVENTION

The present invention relates to wireless communication systems in general, and particularly relates to base station architectures for next generation CDMA radio access networks.

Most first and second-generation CDMA radio access networks use proprietary network architectures and protocols to provide interconnection between the core of the radio access networks (e.g. MSC) and the base transceiver stations (BTSs). One such proprietary network is known as the base communication network (BCN). A BCN employs a star-cluster topology in which clusters of processing devices are attached to each leg of the star. Base station controller (BSC) functionality is distributed among these processing devices. Some level of robustness is achieved in the BCN architecture by distributing mission critical functions on different legs of the star, and by using a redundant hub that constantly monitors its own health.

Demand for wireless services has increased dramatically in recent years. This increased demand has exposed a number of limitations in the BCN architecture. The BCN links are limited in bandwidth to about 10 Mbps. The BCN transport bandwidth places a ceiling on the number of Erlangs that can be supported and the physical volume of equipment required to increase call volume further makes it impractical to evolve the architecture. In addition, because multiple devices share the same BNC links, which are not fault tolerant, a transport failure can result in a significant number of dropped calls. Also, a proprietary communication protocol requires the use of special analyzers to observe information flow and monitor performance of the radio access network.

BRIEF SUMMARY OF THE INVENTION

A base station controller platform comprises a redundant, distributed switching fabric flexibly interconnecting needed call processing resources in a fault tolerant fashion. Preferably, the switching fabric comprises a high data rate transport based on ATM. A central ATM-based switching resource interfaces with the different call processing resource pools via a number of distributed ATM switches. With this approach, call-processing flows may be established through the base station controller using the specific resources needed for the particular type of call, based on configuring the switching fabric for the appropriate resource interconnection.

The disclosed architecture provides high call density and scalability based on the high data rate capacity of the switching fabric and the arrangement of resource pools. In a rack arrangement, a hub subrack carries a centralized switching resource to support interconnection with one or more processing subracks. The processing subracks may be configured to each carry the different types of processing resources needed to support communication between associated radio base stations and, for example, a mobile switching center or a packet data network. In this manner, a system controller can essentially establish a complete call flow through the base station controller on a single processing subrack. Performance is improved by minimizing the need to pass call-related data across processing subracks via the centralized switching resource.

Of course, the flexibility of the distributed, redundant switching fabric permits other rack architectures. For example, the different types of processing resources may be organized by processing subrack, with each type of processing subrack independently accessible via the centralized switching resource. In any case, the disclosed base station controller architecture provides for high call density. For example, the disclosed architecture provides call capacity in excess of 6000 Erlangs within a volume no larger than three industry standard equipment cabinets. This high call density is bolstered by the fault tolerance afforded by the redundant transport (communication) links interconnecting the call processing resources, which provides high equipment availability ratings necessary to meet applicable reliability requirements.

DETAILED DESCRIPTION OF THE INVENTION

The present invention is described in terms of an advanced base station control system (BSC) for use in a third generation (3G) Code Division Multiple Access (CDMA) wireless communication network. Some of the nomenclature used in describing the various call processing resources is specific to the assignee of the instant application, but the resource functionality will be readily apparent to those skilled in the art. Moreover, it should be understood that the BSC architecture described below may, due to its novel interconnection and flexible call processing flow, be implemented in a number of different ways.

Figure 1:
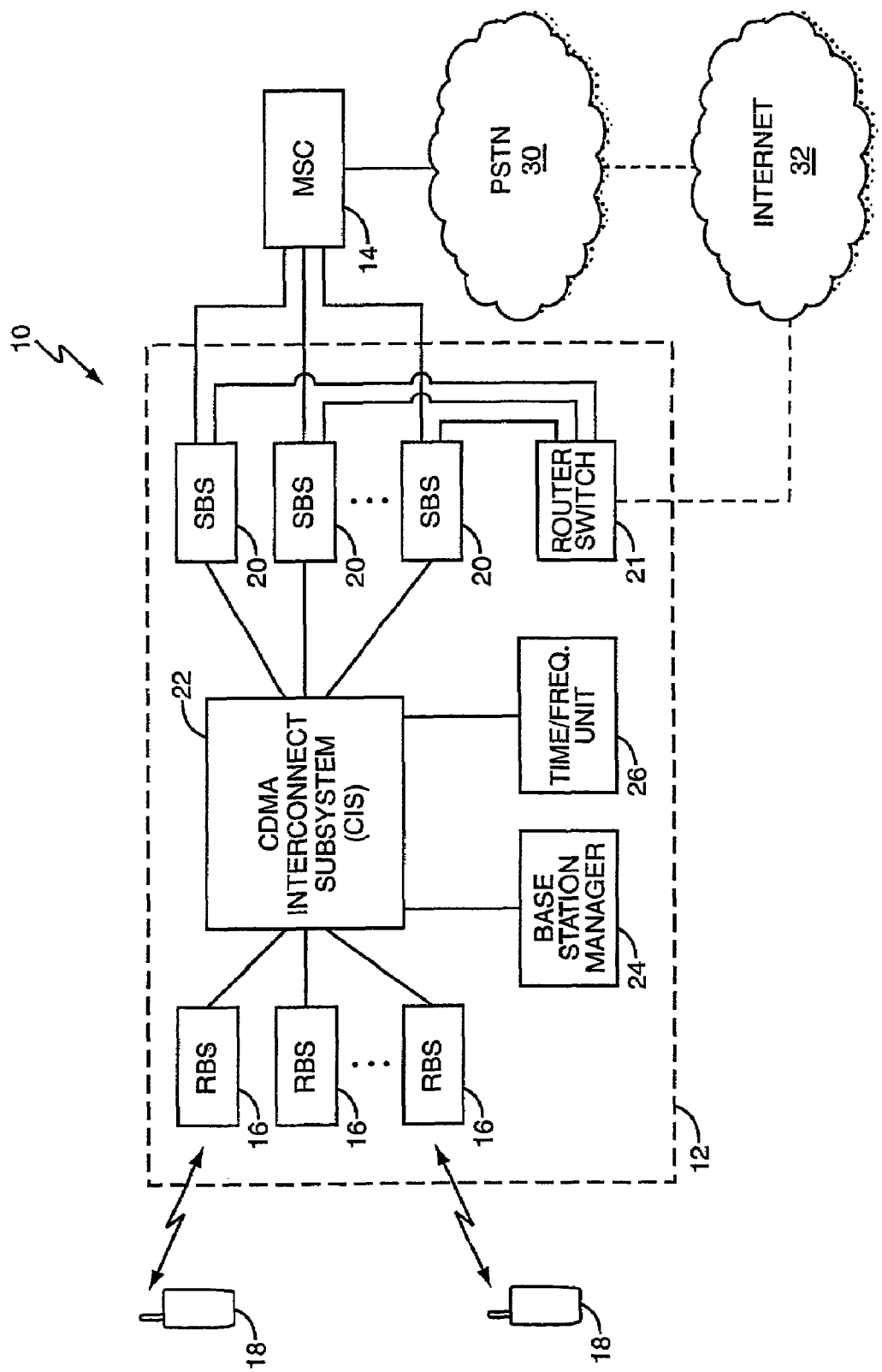
FIG. 1 is a diagram of a prior base station control system.

Turning now to the drawings, FIG. 1 is a diagram of a wireless communication network 10 comprising a typical CDMA BSC 12, one or more mobile switching centers 14, one or more radio base stations (RBSs) 16, and a plurality of wireless access terminals 18, also referred to as user terminals (UT) 18. The BSC 12 comprises a plurality of selector bank subsystems (SBSs) 20 providing communication interface and processing functions in support of voice and data calls to and from the UTs 18. A CDMA Interconnect System (CIS) 22 provides interconnection between the SBSs 20 and a plurality of RBSs 16. The SBSs 20 may interface to the Internet 32 through a router switch 21. A base station manager or controller 24 provides overall control of the BSC 12, and a time/frequency unit (TFU) 26 provides timing reference signals for coordination and synchronization of the BSC 12 within the network 10.

In operation, the BSC 12 cooperates with the MSC 14 to provide communication between the UTs 18 and the PSTN 30 and, possibly, the Internet 32. Depending upon the type of call placed from or to a given one of the UTs 18, the BSC 12 performs certain signal processing and call management functions. For example, for a voice call, the call is routed through one of the SBSs 20, where voice encoding and decoding (vocoding) is performed, along with echo cancellation processing and certain radio link management operations. Call data from an SBS 20 is packetized for transfer to the appropriate RBS 16 via the CIS 22, which operates as a relatively high capacity switch, passing call data to and from the RBSs 16 and SBSs 20.

Each SBS 20 includes a portion of the overall call processing and support resources contained within the BSC 12. A certain number of the communication links (e.g., T1/E1 lines) between the BSC 12 and MSC 14 are routed into each of the SBSs 20. Communication traffic does not cross between SBSs 20 and call processing resources are not shared between SBSs 20. Thus, the loss of a single SBS 20 results in the loss of a potentially significant portion of the overall call processing capacity of the BSC 12. Moreover, the arrangement and design of SBSs 20 is such that the processing or functional flow of a given call is substantially constrained to the flow defined by the architecture of the SBS 20. That is, the processing path of a given call is determined first by the SBS 20 to which it is allocated, and by the architecture of the SBS 20 itself.

Figure 2:
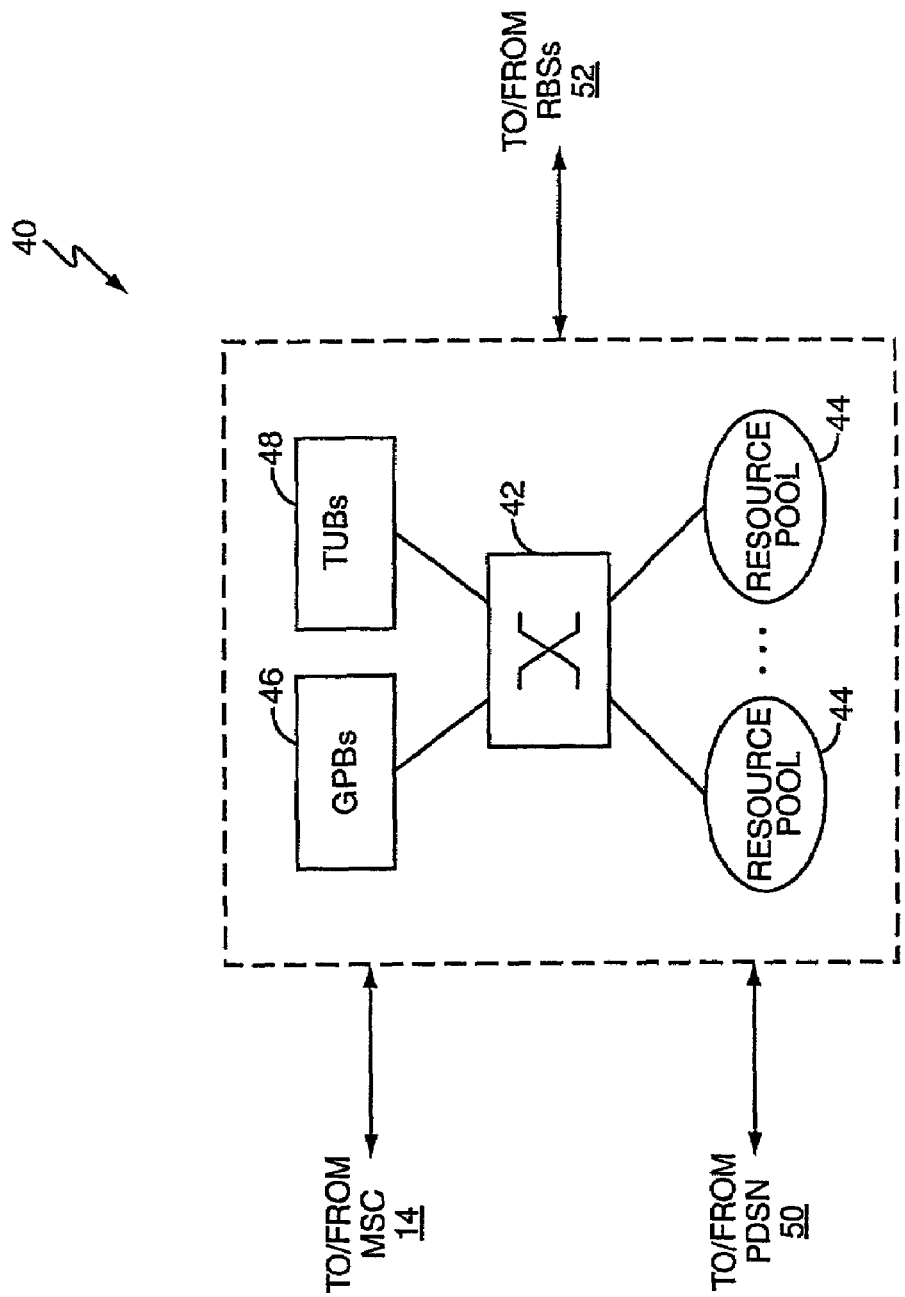
FIG. 2 is a diagram of a general architecture for a base station control system in accordance with the present invention.

FIG. 2 is a simplified diagram of a base station controller (BSC) 40 in accordance with the present invention. The BSC 40 comprises a distributed switching fabric 42, a number of communication processing resource pools 44, one or more general-purpose processor boards (GPBs) or controllers 46, and a Timing Unit Board (TUB) 48. Typically, the BSC 40 includes redundant TUBs 48. The BSC 40 interfaces with one or more MSCs 14, a packet data network serving node (PDSN) 50, and one or more RBSs 52. Generally, the BSC 40 communicatively couples a plurality of UTs 18 a core network that typically comprises the MSC 14 and the PDSN 50.

In general, each resource pool 44 is an overall collection of like processing devices or resources that provide one or more aspects of call processing, control, and management function within the BSC 40. The arrangement of switching fabric 42 and resource pools 44 provides a number of significant advantages. For example, the BSC 40 may be made exceptionally fault tolerant by making the switching fabric 42 redundant, such that resource pools 44 are accessible via two or more communication links. Further, the call processing flexibility of the BSC 40 is significantly enhanced because the particular functional flow for a given call or type of call is determined by the configuration of the switching fabric 42 under control of the controller 46. That is, the controller 46 chooses the specific processing resources allocated to a given call by configuring the switching fabric 42 to establish a given set of interconnections dedicated to that call through the BSC 40. Additionally, the scalability of the BSC 40 is significantly improved as the switching fabric 42 flexibly supports the addition of new or expanded resource pools 44.

Figure 3:
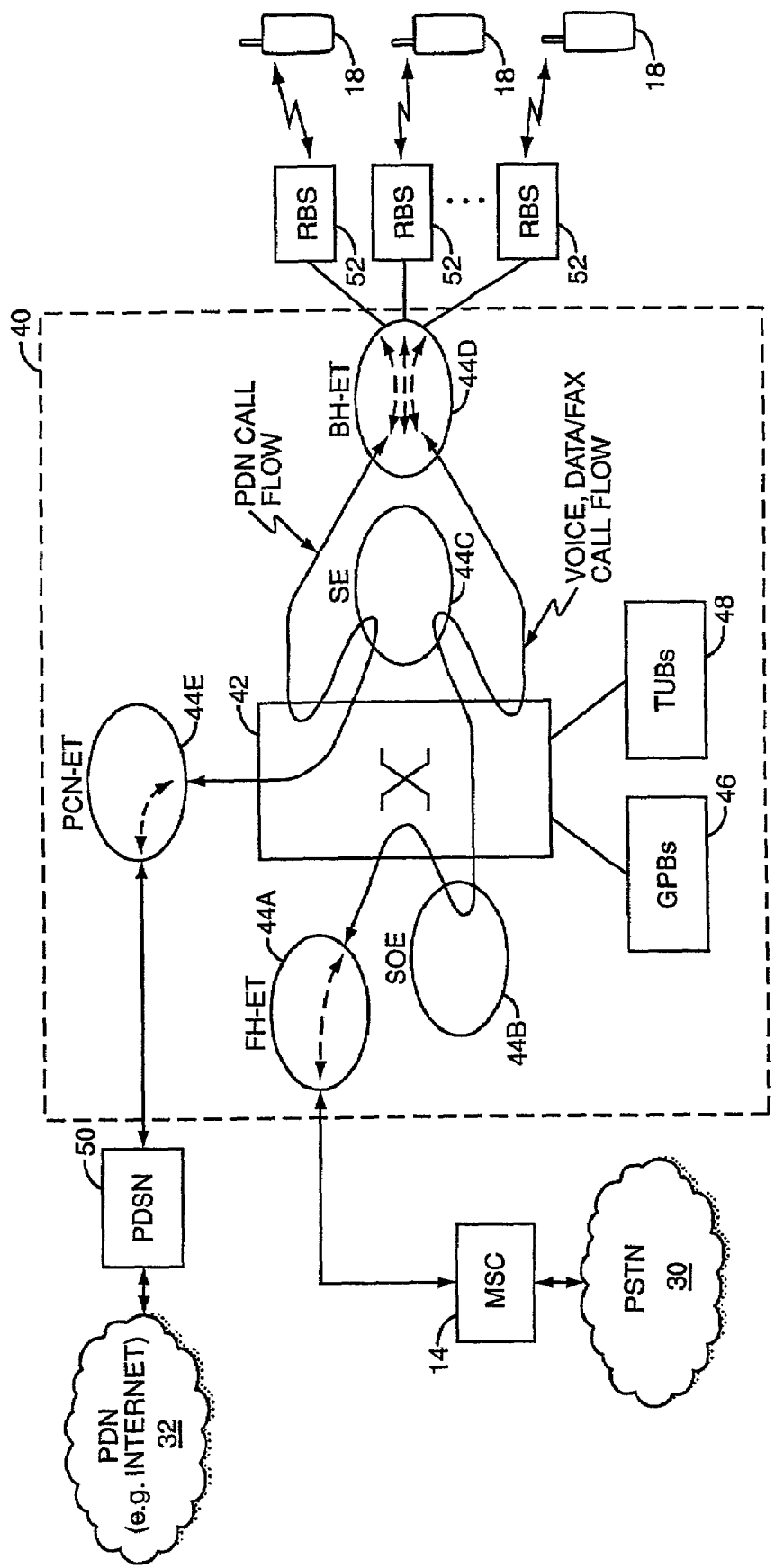
FIG. 3 is a more detailed diagram of the base station control system of FIG. 2.

FIG. 3 is a more detailed diagram of the BSC 40 and illustrates two typical call processing flows, one for voice and traditional data/fax calls, and one for packet data calls. The BSC 40 typically includes one or more of the following resource pools 44:

- front haul exchange termination (FH-ET) resources 44A providing termination for communication links between the BSC 40 and one or more MSCs 14;
- service option element (SOE) resources 44B providing selected signal processing functions such as vocoding and echo cancellation for voice calls, and pass-through functions for traditional asynchronous data/fax calls;
- selector element (SE) resources 44C providing radio link management such as handover and outer loop power control and signaling functions, and for packet data calls the SE resources 44C provide protocol support for TCP/IP, and for async data/fax they provide the radio link protocol (RLP) and the intersystem link protocol (ISLP);
- back haul exchange termination (BH-ET) resources 44D providing termination between the BSC 40 and one or more RBSs 52; and
- packet core network exchange termination (PCN-ET) resources 44E providing termination between the BSC 40 and a packet data serving node (PDSN) 50.

The switching fabric 42 preferably comprises a number of Asynchronous Transfer Mode (ATM) switches, or possibly a number of high data rate Ethernet switches. ATM switching includes the advantages of data rates in excess of 600 Mbps and the ATM switching protocol's independence of data type. That is, with ATM, call traffic and management information passes through the switching fabric 42 in the same 53-byte "cells" regardless of whether the call is a voice, async data/fax, or packet data call. Also, the ATM layer is independent of the type of physical link between resource pools 44. Thus, the links between the resource pools 44 and the switching fabric 42 may be electrical or optical as needed or desired without changing the underlying protocol.

ATM implementation of the switching fabric 42 has the further advantage of straightforward assignment and management of quality of service (QoS) for calls routed through the BSC 40. QoS may be easily defined for individual calls or groups of calls, and supported by appropriate channel assignments within the ATM-based switching fabric 42.

The switching fabric 42 may also be implemented as an IP-based switch. In that type of implementation, the switching fabric 42 becomes a packet-switched arrangement, rather than the circuit-switched arrangement associated with the ATM-based implementation. In either case, the available devices or resources within each resource pool 44 are accessible for call processing as needed through the switching fabric 42.

As noted, FIG. 3 illustrates two typical call processing flows, a first functional path supporting the more traditional voice and async data/fax calls to and from the UTs 18, and a second functional path supporting packet data calls between the UTs 18 and a packet data network (PDN) 32, such as the Internet. The controller 46 configures each of these functional paths based on configuring the switching fabric 42 to access specific resources within each of the resource pools 44 involved in supporting the functional flow.

For voice and async data/fax calls, the processing route from the MSC 14 to a given one of the access terminals (UT) 18 is:

PSTN→MSC→*FH-ET*→*SOE*→*SE*→*BH-ET*→RBS→UT.

Where the italicized elements represent resources within the BSC 40. From the UT 18, the call processing route is:

UT→RBS→*BH-ET*→*SE*→*SOE*→*FH-ET*→MSC. Note also that similar functional flows may be established for communication between UTs 18.

For packet data calls, the processing route from the PDN 32 to a given one of the UTs 18 is:

PDN→PSDN→PCN-ET→SE→BH-ET→RBS→UT.

From the UT 18 to the PDSN 50, the call processing route is:

UT→RBS→BH-ET→SE→PCN-ET→PDSN→PDN.

Note that with CDMA soft handoff, calls may be simultaneously routed through multiple RBSs 52, and this is implicit in the above call routing flows.

As noted above, the controller 46 configures the switching fabric 42 to select specific processing resources, such as a particular digital signal processor (DSP)—not shown—from within the SOE resource pool 44B, by configuring the switching fabric 42. More specifically, in making a SOE resource assignment for a given call, the controller 46 selects an available SOE resource, such as a DSP, from the SOE resource pool 44B, by configuring the switching fabric 42 to access the specifically assigned DSP from the SOE resource pool 44B.

Thus, the individual resources within the various processing pools 44 are essentially available on a global basis according to the needs of a given call routed through the BSC 40. Configuration of the switching fabric 42 to support the functional flow (processing path) for a given call creates a dedicated set of circuit resources and transport channels for that call. The BSC 40 releases these dedicated resources upon termination of the call.

Figure 4:
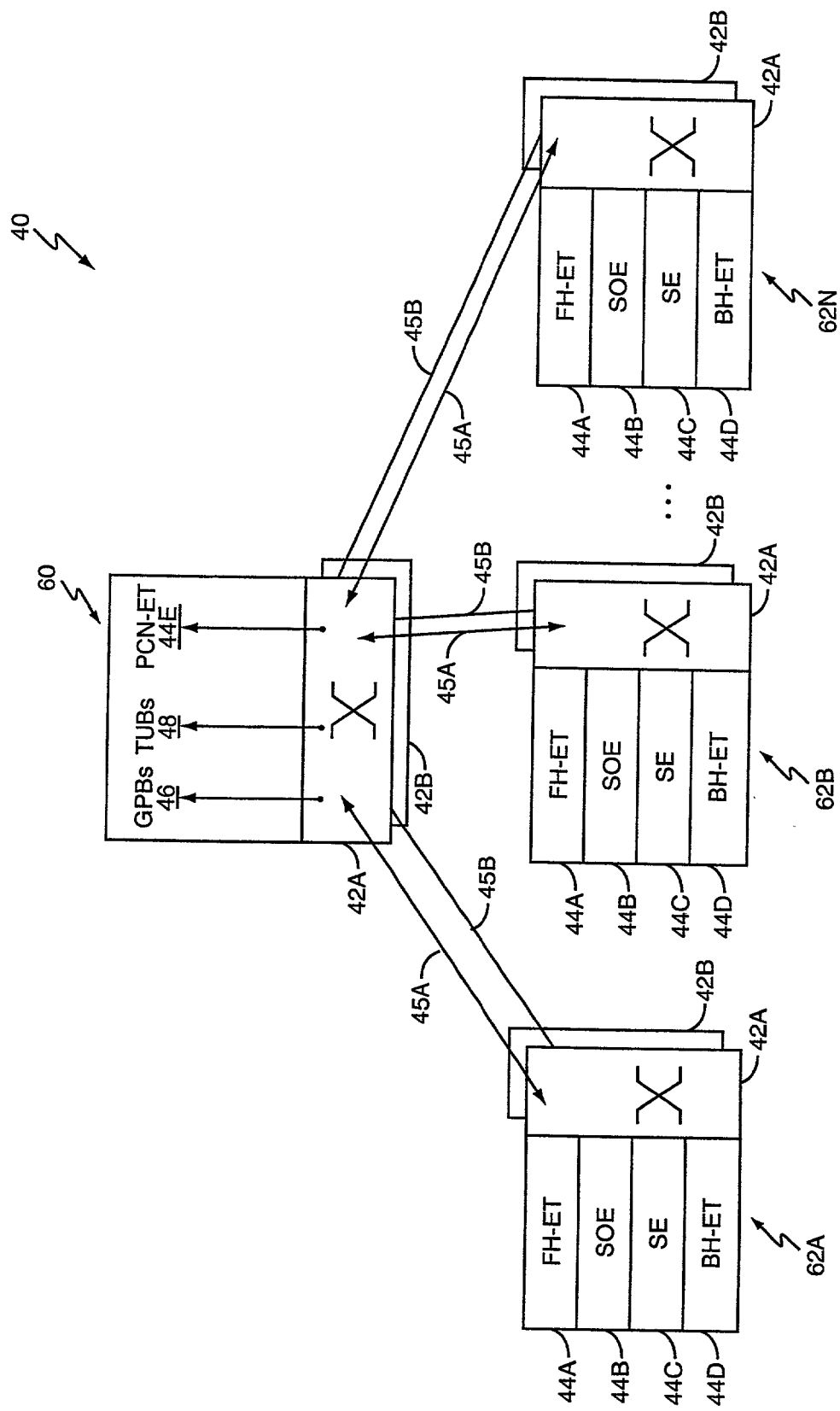
FIG. 4 is a diagram of an exemplary subrack arrangement for the base station control system of FIG. 3.

FIG. 4 is a diagram of an exemplary rack/subrack architecture for the BSC 40. With the "mixed" subrack architecture depicted, the fault tolerance and scalability of the BSC 40 are enhanced. These enhancements yield direct benefits to service providers seeking maximum call processing density with minimal loss of call processing capability arising from single-point equipment faults.

In this mixed architecture arrangement, the BSC 40 comprises a "hub" subrack 60 and one or more processing subracks 62. In the illustrated example, the BSC 40 comprises processing subracks 62A through 62N. Each processing subrack 62 includes a portion of resources from each type of resource pool 44. That is, each processing subrack 62 includes a portion of the FH-ET resource pool 44A, a portion of the SOE resource pool 44B, a portion of the SE resource pool 44C, and a portion of the BH-ET resource pool 44D. In this arrangement, a particular resource pool 44, the SOE resource pool 44B for example, comprises the overall set of SOE resources distributed across the number of processing subracks 62A . . . 62N installed in the BSC 40.

The hub subrack 60 comprises primary and secondary central switching cores that interface with primary and secondary processing subrack switches, one or more GPBs (controllers) 46, one or more TUBs 48, and the PCN-ET resource pool 44E. Together, the hub subrack and processing subrack switching resources comprise a primary distributed switching fabric 42A and a secondary distributed switching fabric 42B. The switching fabric 42 provides access between GPBs 46 and the resource pools 44, including the PCN-ET 44E resources located on the hub subrack 60.

Communication links between the hub subrack 60 and the various processing subracks 62 comprise redundant primary links 45A and secondary links 45B. Thus, the controller 46 may assign specific processing resources in any one of the processing subracks 62 to support a given call routed through the BSC 40, independent of the other resource assignments made for that call. For example, assume that a given call originates via the PSTN 30 and terminates through the MSC 14 into the portion of the FH-ET resource pool 44A carried by the processing subrack 62A. In support of the call, the controller 46 may assign SOE resources 44B from the processing subrack 62B, and SE resources 44C and BH-ET resources 44D from the processing subrack 62N, depending upon the availability of specific processing resources in the overall set of subracks 62. This flexibility in resource allocation across processing subracks 62 combined with the redundancy of primary and secondary switching fabrics 42A and 42B (along with redundant links 45A and 45B), yields exceptional fault tolerance and scalability.

Although the controller 46 (or controllers 46) may freely allocate needed processing resources across the various processing subracks 62, a certain degree of resource allocation optimization may offer overall call processing capacity improvements to the BSC 40. For example, in the mixed architecture of FIG. 4, the controller 46 may preferentially allocate needed call processing resources such that, where possible, the call processing flow is constrained to a single processing subrack 62.

By preferentially allocating resources common to a given processing subrack 62, the switching resources local to the processing subrack 62 may be utilized to move call traffic data from specific resources in one resource pool 44 to another. This avoids moving call traffic across the communication links 45 and into another processing subrack 62 via the hub subrack 60. Thus, in the illustrated example, the ATM switching resources on a given processing subrack 62 move call traffic between the different resource types (e.g., SO, SOE, etc.) on that subrack, while the given processing subrack's ATM switching resources combine with the hub subrack's centralized (core) ATM switching resources to move call traffic and control information across processing subracks 62.

It is expected that intra-rack ATM switching rates will exceed 300 Mbps, while inter-rack ATM switching rates will exceed 150 Mbps for each redundant link 45A and 45B. Of course, the ATM switching fabric 42 may be designed to take advantage of higher transport rates as needed.

In the mixed architecture illustrated for the processing subracks 62, each processing subrack 62 includes call processing resources from all the resource pools 44, except for PCN-ET 44E resources—although this latter resource pool 44 may also be distributed across the processing subracks 62. By including the basic complement of call processing resources on each subrack 62, scalability of the BSC 40 is enhanced. From a system operator's perspective, adding a readily quantifiable amount of call processing capacity to the BSC 40 entails adding one or more processing subracks 62, since each processing subrack 62 substantially provides all of the processing resources 44 needed to complete call routing and processing through the BSC 40.

Figure 5:
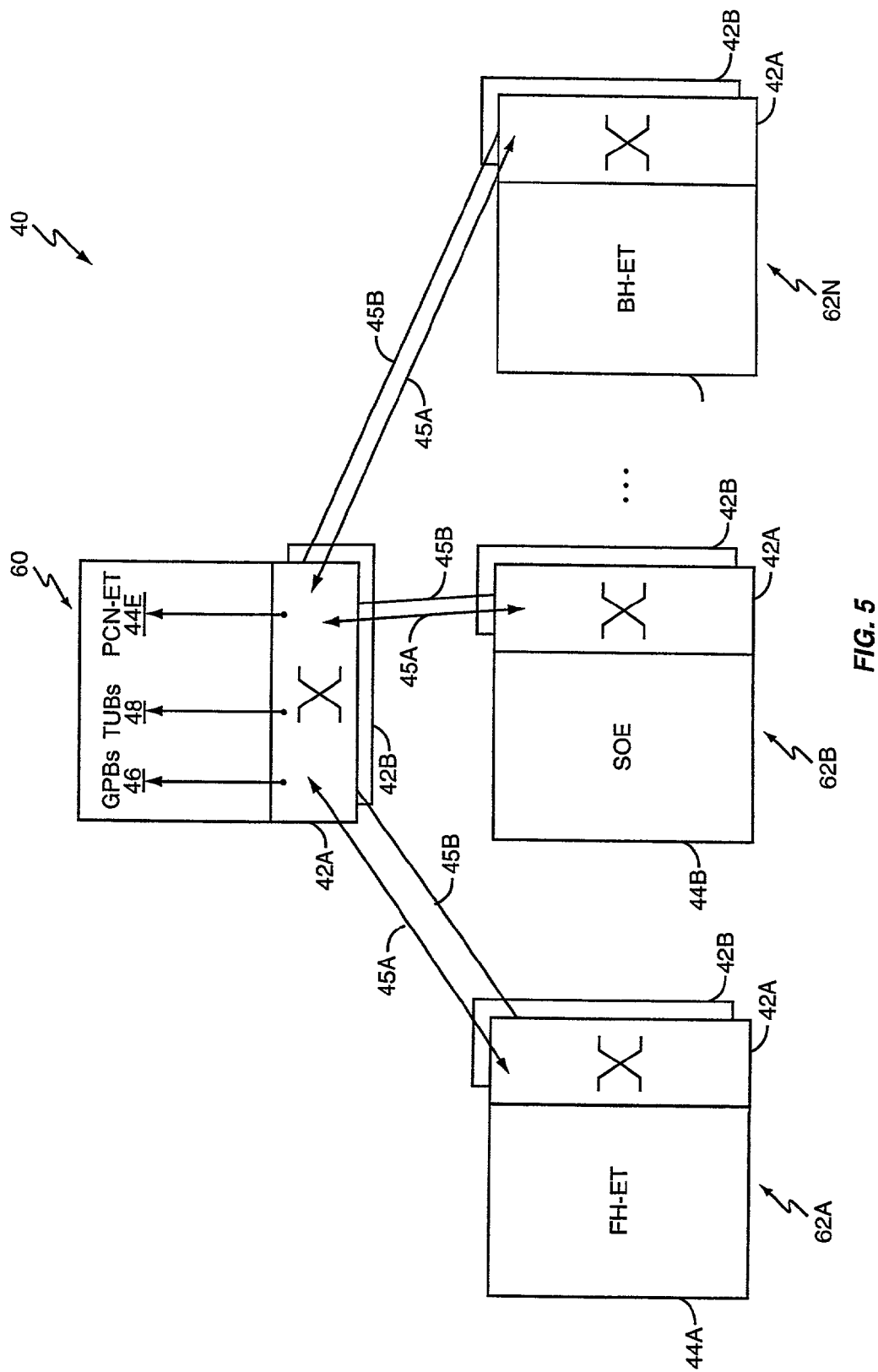
FIG. 5 is a diagram of an alternate exemplary arrangement for the base station control system of FIG. 3.

FIG. 5 is a diagram of an exemplary alternate subrack architecture for the BSC 40. In this implementation, each processing subrack 62 is homogeneous in terms of the processing resources it carries. That is, each processing subrack 62 carries a single type of processing resource. In the illustrated example, the processing subrack 62A carries all of the processing devices comprising the FH-ET resource pool 44A, while processing subrack 62B carries the processing devices providing the SOE resource pool 44B, and so on. Note that one or more of the resource pools 44 may be expanded such that more than one processing subrack 62 is dedicated to that resource pool 44. However, even in this scenario, each processing subrack 62 carries only one type of processing device (e.g., FH-ET, SOE, SE, etc.).

To route a given call through the BSC 40, the controller 46 configures the switching fabric 42 to interconnect the specific processing devices needed for the call from one or more of the resource pools 44 across the various processing subracks 62. The controller preferably configures an ATM connection between specific devices in the various resource pools 44 using the primary switching fabric 42A or, in the presence of failure, the secondary switching fabric 42B. In some cases, the switching fabric 42 may be configured to operate with mixed portions from both the primary and secondary switching fabrics 42A and 42B, respectively.

Of course, the flexibility afforded by selecting a functional route for calls by simply configuring the switching fabric 42 permits the BSC 40 to be implemented in a variety of other hub and processing subrack configurations. For example, a given processing subrack 62 may be configured to carry only two distinct types of call processing resources (two types of resource pools 44) in a "duet" style architecture. The particular types of processing resources carried by any one processing subrack 62 may be selected to minimize switching traffic through the hub subrack 60, or, for example, to enhance scalability from the perspective of system operators.

Figure 6:
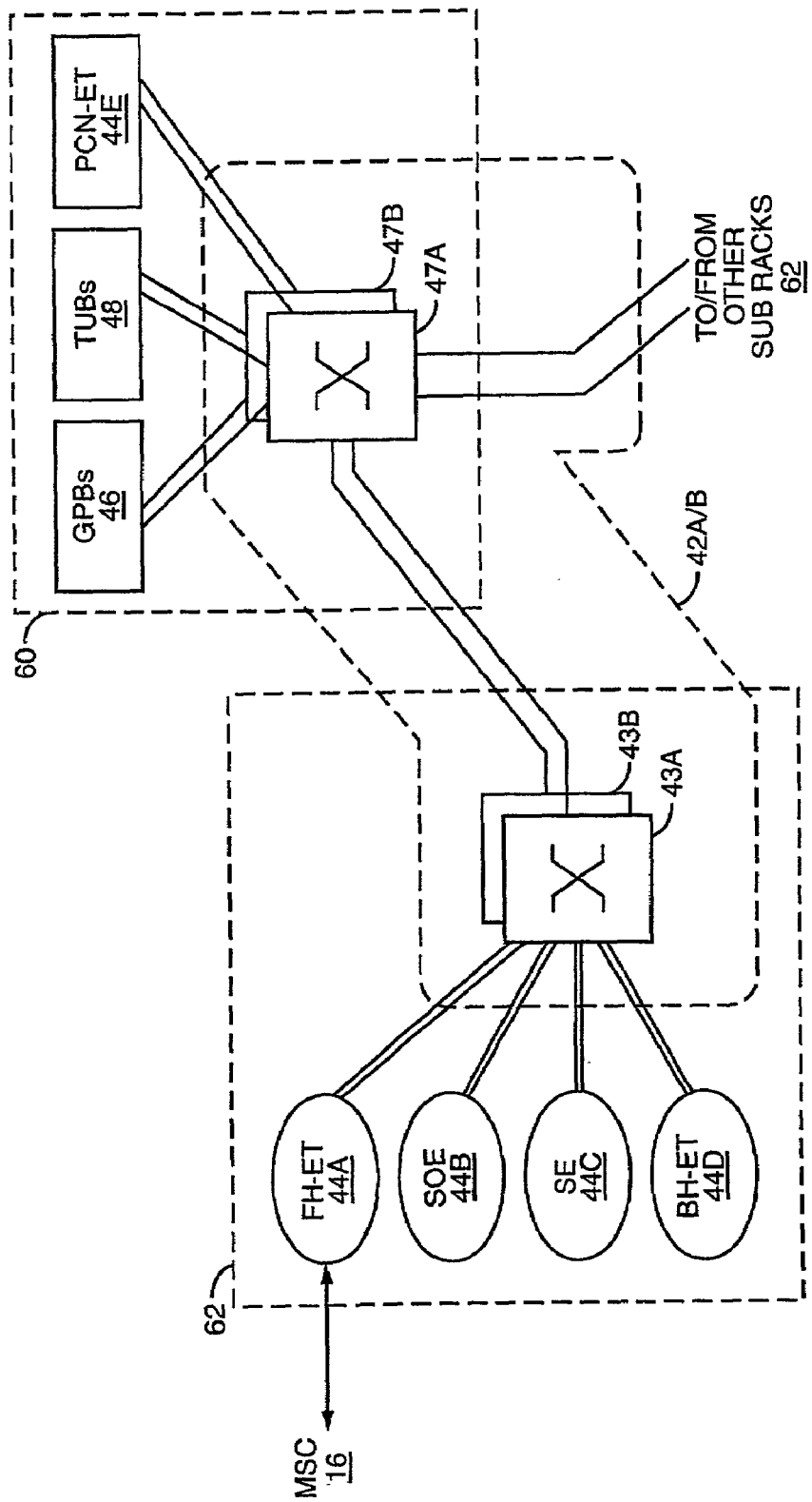
FIG. 6 is a diagram of the distributed switching fabric used in the base station control system of the present invention.

FIG. 6 better illustrates the ATM-based switching fabric 42A/B in the rack architecture introduced in FIG. 4. Each processing subrack 62 includes redundant ATM switching interfaces 43A and 43B coupling the processing subrack 62 to the centralized ATM switching interface 47A and 47B carried by the hub subrack 60. Here, the switching resources carrying the "A" designation comprise the primary switching fabric 42A, while those carrying the "B" designation comprise the secondary switching fabric 42B. The combination of the primary and secondary switching resources combine generally to form the redundant, distributed switching fabric 42 discussed herein.

Figure 7:
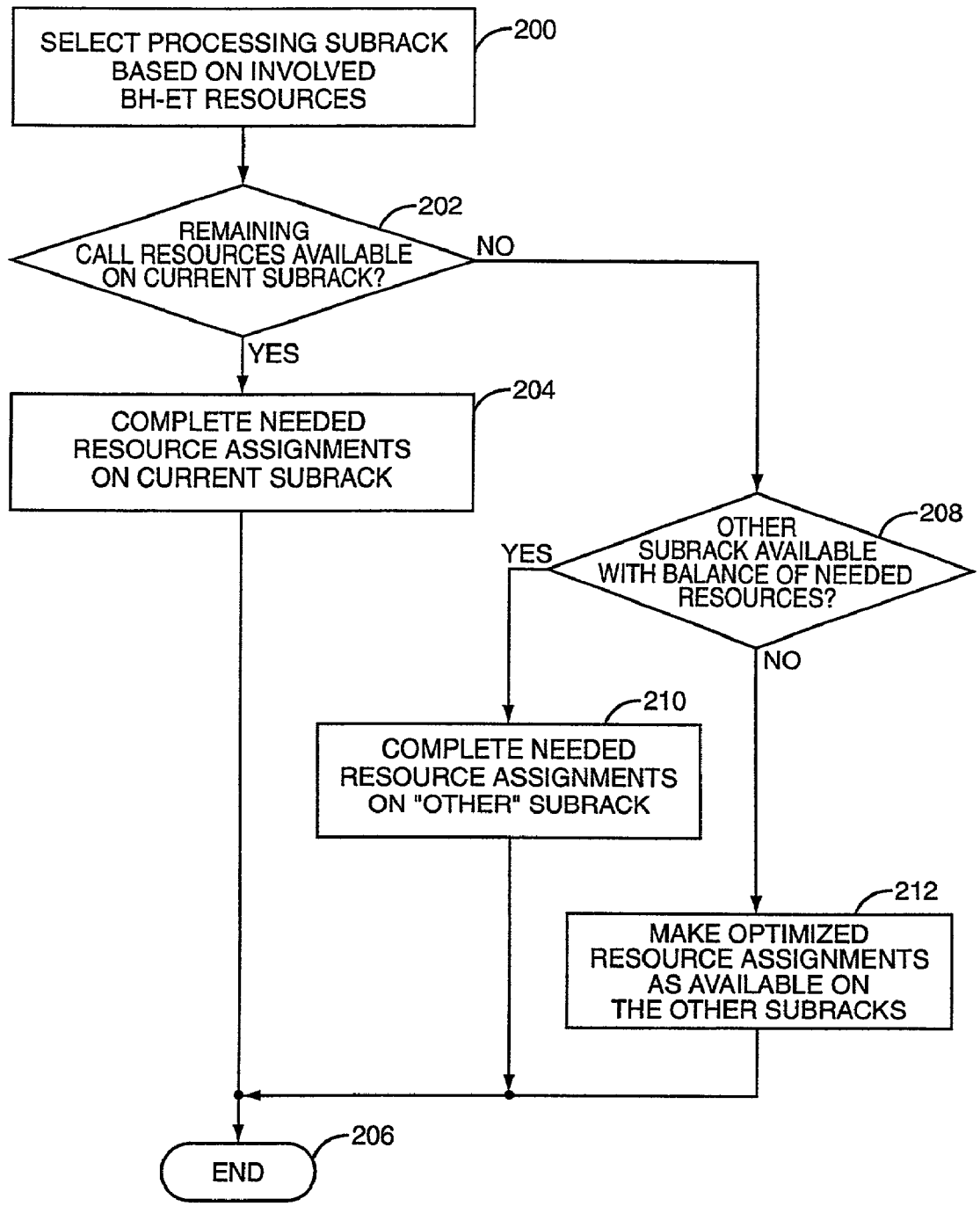
FIG. 7 is a diagram of flow logic for base station control system call processing resource allocation for the subrack architecture of FIG. 4.

FIG. 7 illustrates exemplary flow logic for call processing resource allocation in the context of the mixed rack architecture of FIG. 4. Processing begins with selection of the appropriate BH-ET resources from the BH-ET resource pool 44D (block 200). This amounts to selecting the processing subrack 62 that carries the BH-ET resources supporting the specific RBS 52 involved in the call. In general, each processing subrack 62 supports specific ones of the RBSs 52 and selection of the appropriate BH-ET resources from the BH-ET resource pool 44D for a given call depends on which RBS 52 is supporting the UT 18 involved in the call.

Once the processing subrack 62 with the needed BH-ET resources is selected, the controller 46 assigns remaining call processing resources as needed. In an optimized approach, the controller 46 determines if the initially selected processing subrack 62 has the requisite remaining call resources available for completing the call routing through the BSC 40 (block 202). If so, the controller 46 assigns SE, SOE, and FH-ET resources as needed from the portions of the SE 44C, SOE 44B, and FH-ET 44A resource pools carried on the initially selected processing subrack 62 (block 204). In this manner, the call processing remains local to the processing subrack 62, which helps minimize inter-subrack switch traffic routed through the hub subrack 60. The controller 46 may also assign resources from the PCN-ET resource pool 44E as needed.

A needed resource may not be available on the same processing subrack (block 202), in which case the controller 46 determines if a remaining one of the subracks 62 has the needed call processing resources available to complete the call processing flow (block 208). If so, the controller makes the necessary resource assignments to complete the call processing flow on that "other" processing subrack 62 and appropriately configures the switching fabric 42 (block 210).

Once the necessary resource assignments are made from the various resource pools (e.g., 44A, 44B, 44C, 44D, and 44E) and the switching fabric 42 is appropriately configured, call flow resource assignment operations end for the given call (block 206).

If none of the remaining processing subracks 62 have the needed resources available to complete the call processing flow (block 208), the controller 46 makes resource assignments across the minimum number of processing subracks 62 as needed to complete the call processing flow (block 212). Once the necessary resource assignments are made from the various resource pools (e.g., 44A, 44B, 44C, 44D, and 44E) and the switching fabric 42 is appropriately configured, call flow resource assignment operations end for the given call (block 206).

Note that the ability of the controller 46 to constrain call flow resource assignments so that selected devices from the various resource pools 44 reside on the minimum possible number of processing subracks 62 depends to some extent on whether the MSC 14 allows the BSC 40 to assign FH-ET resources from the FH-ET resource pool 44A as needed. Some types of MSCs 14 make the FH-ET link selection during call setup, rather than allowing the BSC 40 to make the selection. Since each processing subrack 62 carries a specific portion of the FH-ET resource pool 44A, the specific FH-ET link assigned by the MSC 14 determines which processing subrack 62 will be used to interface with the MSC 14 for the given call.

Under these circumstances, a given call has a back-end processing subrack selection constraint imposed by which RBS 52 is involved, and a front-end processing subrack selection constraint imposed by which FT-ET link is assigned by the MSC 14. Even so, the BSC 40 can still optimize call flow routing. For example, the controller 46 can bias call processing resource allocation to either the processing subrack 62 with the MSC-assigned FH-ET resources, or the processing subrack 62 with the specific BH-ET resources interfacing with the required RBS 52.

In general, the BSC 40 preferably works to optimize call flow processing resource allocations made from across the resource pools 44 in support of a given call to minimize the number of processing subracks 62 used to support the call. More generally, the BSC 40 works to minimize inter-subrack switching for any given call flow. In support of this, the BSC 44 may be configured to dynamically re-allocate resource assignments for one or more current calls as resources on specific processing subracks 62 within one or more of the resource pools 44 become available during the course of operation.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A base station controller system comprising:
   a plurality of resource pools, each said resource pool comprising resources supporting at least one call processing function; and
   a system controller to allocate selected combinations of specific resources from one or more of said plurality of resource pools to provide desired call processing for respective ones of calls to and from a plurality of wireless access terminals;

said base station controller organized as:
a hub subrack comprising a central switching resource and said system controller; and
at least one processing subrack to carry said plurality of resource pools, each said at least one processing subrack comprising resources from each of said plurality of resource pools and switching resources to communicatively couple said processing subrack to said hub subrack;
said switching resources on each said processing subrack and said central switching resource on said hub subrack together comprising a switching fabric to communicatively couple said hub subrack with each of said at least one processing subrack, said switching fabric comprising:
a communication switch on said hub subrack;
a communication switch on each said at least one processing subrack; and
a plurality of communication links between said communication switches on said at least one processing subrack and said communication switch on said hub subrack.

2. The base station controller system of claim 1 wherein said communication links between each said processing subrack and said hub subrack comprise redundant first and second communication links.

3. The base station controller system of claim 2 wherein each said communication switch on said hub subrack and each said processing subrack comprises redundant primary and secondary communication switches for switching said first and second communication links, respectively.

4. The base station controller system of claim 3 wherein said switching fabric comprises a primary switching fabric and a redundant secondary switching fabric, said primary switching fabric comprising said first communication links and said first communication switches, and said secondary switching fabric comprising said second communication links and said second communication switches.

5. The base station controller system of claim 1 wherein said communication switches on said hub subrack and each said processing subrack comprise one of a set of ATM switches, Ethernet switches, or Internet Protocol (IP) switches.

6. The base station controller system of claim 1 wherein each said processing subrack comprises a percentage of an overall call processing capacity of said base station controller system, and further wherein the overall call processing capacity of said base station controller system may be scaled based on adding additional processing subracks.

7. The base station controller system of claim 1 wherein said system controller comprises at least one general processing board operative to configure said central switching resource on said hub subrack and said switching resources on one or more processing subracks to select combinations of specific resources from one or more of said plurality of resource pools for each call routed through said base station controller.

8. The base station controller system of claim 7 wherein said system controller comprises a processing subsystem configured to optimize resource selections such that resource assignments comprising said selected combinations of resources from said one or more of said plurality of resource pools are selected from a minimum number of processing subracks.

9. The base station controller system of claim 1 wherein said plurality of resource pools comprise:

front haul exchange termination resources to provide a plurality of front haul communication links with an associated mobile switching center, each said front haul communication link carrying call traffic for at least one call between said base station controller system and the associated mobile switching center;

back haul exchange termination resources to provide a plurality of back haul communication links with at least one radio base station, each said back haul communication link carrying call traffic for at least one call between said base station controller system and at least one radio base station in wireless communication with at least one wireless access terminal involved in said at least one call;

selector element resources to provide radio link management for calls being routed through said base station controller; and service option element resources to provide selected signal processing functions, including voice coding and decoding and echo cancellation functions for calls being routed through said base station controller.

10. The base station controller system of claim 1 wherein said resource pools further comprise packet core network exchange termination resources to route packet data calls to and from one or more of the plurality of wireless access terminals to an external packet data network.

11. A method of structuring a base station controller system wherein call processing for each call being routed through the base station controller comprises performing a plurality of call processing functions, the method comprising:

providing a plurality of resource pools, each one of said resource pools providing one of the plurality of call processing functions;

providing redundant and independent access to each said resource pool by interconnecting said plurality of resource pools through a configurable switching fabric;

allocating a specific combination of resources selected from one or more resource pools in said plurality of resource pools to each call being routed through said base station controller by configuring said switching fabric;

organizing the base station controller system as a rack system comprising:
a hub subrack providing centralized switching resources; and
one or more processing subracks, each of said one or more processing subracks carrying at least a portion of the resources from each of said plurality of resource pools and rack switching resources to interface with said hub subrack; and optimizing resource assignments for a given call being routed through the base station controller system by assigning specific resources from one or more resource pools in said plurality of resource pools to minimize the number of said one or more processing subracks used to support the given call.

12. The method of claim 11 further comprising increasing a call processing capacity of the base station controller system based on adding additional processing subracks as needed.

* * * * *

UNITED STATES PATENT AND TRADEMARK OFFICE
CERTIFICATE OF CORRECTION

| | |
|---|---|
| PATENT NO. | : 7,269,181 B2 |
| APPLICATION NO. | : 09/826224 |
| DATED | : September 11, 2007 |
| INVENTOR(S) | : Chun et al. |

It is certified that error appears in the above-identified patent and that said Letters Patent is hereby corrected as shown below:

Title page, item [75]:
    Inventor, "Ravi Palakodety", should be -- Ravi Palakodery --.

Signed and Sealed this

Thirteenth Day of November, 2007

JON W. DUDAS
*Director of the United States Patent and Trademark Office*